(12) United States Patent
Shanmugam et al.

(10) Patent No.: US 9,313,259 B2
(45) Date of Patent: Apr. 12, 2016

(54) METHOD FOR UPDATING AN APPLICATION PROGRAM ON A WIRELESS TERMINAL IN A CONTROLLED MANNER

(75) Inventors: Sankar Shanmugam, Dayton, NJ (US); Shahid Ahmed, Monmouth Junction, NJ (US); Venkat Gaddam, Bridgewater, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 587 days.

(21) Appl. No.: 12/895,474

(22) Filed: Sep. 30, 2010

(65) Prior Publication Data

US 2012/0084766 A1  Apr. 5, 2012

(51) Int. Cl.
*G06F 9/44* (2006.01)
*H04L 29/08* (2006.01)
*G06F 9/445* (2006.01)

(52) U.S. Cl.
CPC  *H04L 67/06* (2013.01); *G06F 8/65* (2013.01); *H04L 67/04* (2013.01); *H04L 67/34* (2013.01); *H04L 67/303* (2013.01)

(58) Field of Classification Search
None
See application file for complete search history.

(56) References Cited

U.S. PATENT DOCUMENTS

| | | | |
|---|---|---|---|
| 7,881,745 B1 * | 2/2011 | Rao et al. | 717/170 |
| 2002/0166001 A1 | 11/2002 | Cheng et al. | |
| 2004/0098421 A1 * | 5/2004 | Peng | 707/203 |
| 2009/0318192 A1 * | 12/2009 | LeBlanc et al. | 455/558 |

FOREIGN PATENT DOCUMENTS

WO  WO-2006-110991  10/2006

* cited by examiner

*Primary Examiner* — Qamrun Nahar (57) ABSTRACT

A method for updating an application program on a wireless terminal in a controlled manner is disclosed. When, a server receives an inquiry from a wireless terminal for updating an application program, the server determines whether there is an updated program available for updating the application program based on information included in the inquiry from the wireless terminal. The server also determines whether updating the application program of the wireless terminal which sent the inquiry is permitted or not at the time of receiving the inquiry based on the information included in the inquiry and criteria information stored in the server. When the server determines that updating the application for the wireless terminal is available and is permitted, the server sends information necessary for updating the application program to the wireless terminal. Then, the wireless terminal updates the application program.

20 Claims, 6 Drawing Sheets

| | |
|---|---|
| DEVICE_MAKE_MODEL | This column stores the wireless terminal make and model. |
| FIRMWARE_VERSION | Indicates version number of the wireless terminal's current firmware. |
| IMPACTED_APP_VERSION | Versions of the application program that would need update. |
| NEW_APP_VERSION | This will be the new version for the impacted the application program. |
| ONLY_FOR_DATACENTER | Specify the list of datacenters that are allowed to enable the update. |
| ONLY_FOR_SERVERS | Specifies the list of servers that are allowed to enable the update. |
| ONLY_FOR_NPA | Specify the list of NPA (first 3 digits of MDN) that are allowed to do the update. If 848-391-3212 is an MDN, the first 3 digits ("848") constitute the NPA. It's also known as the area code. |
| ONLY_FOR_NXX | Specify the list of NXX (second 3 digits of MDN) that are allowed to do the update. If 848-391-3212 is an MDN, the second 3 digits ("391") constitute the NXX. It's also known as the exchange code. |
| DOWNLOAD_URL | This field will hold the download URL of the updated files. |
| DATE_AVAILABLE_FROM | Using this field, we can specify when the effective time window for update begins. |
| DATE_AVAILABLE_UPTO | This specifies when the effective time window ends. |
| ACTIVE_FLAG | Indicates the effectiveness of this record. This field will hold "Yes" or "No" keywords. By setting to "No", we can stop the update activity for devices identified by this record. |
| IS_MANDATORY | Indicates whether the update is mandatory or not. |
| MAX_NUM_SKIP_ALLOWED | User would be allowed this many times to say no to prompts for update. After that the update would become a must for the application program to run properly. |

FIG. 5A

| DEVICE_MAKE_MODEL | ANY |
|---|---|
| FIRMWARE_VERSION | ANY |
| IMPACTED_APP_VERSION | 005 |
| NEW_APP_VERSION | 006 |
| ONLY_FOR_DATACENTER | ANY |
| ONLY_FOR_SERVERS | ANY |
| ONLY_FOR_NPA | 200-220 |
| ONLY_FOR_NXX | ANY |
| DOWNLOAD_URL | http;//www.verizon.com/datacener001 |
| DATE_AVAILABLE_FROM | AUG_5_2010_01:00:00 |
| DATE_AVAILABLE_UPTO | AUG_31_2010_23:00:00 |
| ACTIVE_FLAG | YES |
| IS_MANDATORY | NO |
| MAX_NUM_SKIP_ALLOWED | 10 |

FIG. 5B

| DEVICE_MAKE_MODEL | MAKE_ABC-CO; MODEL_0012 |
|---|---|
| FIRMWARE_VERSION | 002 |
| IMPACTED_APP_VERSION | 005 |
| NEW_APP_VERSION | 006 |
| ONLY_FOR_DATACENTER | 001-002 |
| ONLY_FOR_SERVERS | ANY |
| ONLY_FOR_NPA | 212 |
| ONLY_FOR_NXX | ANY |
| DOWNLOAD_URL | http;//www.verizon.com/datacener005 |
| DATE_AVAILABLE_FROM | AUG_5_2010_01:00:00 |
| DATE_AVAILABLE_UPTO | AUG_31_2010_23:00:00 |
| ACTIVE_FLAG | YES |
| IS_MANDATORY | NO |
| MAX_NUM_SKIP_ALLOWED | 10 |

METHOD FOR UPDATING AN APPLICATION PROGRAM ON A WIRELESS TERMINAL IN A CONTROLLED MANNER

TECHNICAL FIELD

This application relates to a method for updating an application program on wireless terminals in a controlled manner. Specifically, the present application is directed to a method in which updating an application program on a wireless terminal is carried out when a server permits updating the application program.

BACKGROUND

An application program on a wireless terminal (e.g., a wireless phone, a smart phone, a cellular phone, a PDA, etc) includes executable codes and may include one or more other necessary files such as a configuration file or a property files. An example of the executable codes is an application program. All these files generally reside in the wireless terminal. When it is necessary to fix some issues in the application program or new features and/or functionalities of the application program need to be added, the executable codes of the application program, along with associated supporting files, have to be updated. In other words, it becomes necessary to update the application program.

A large mobile service provider or carrier sells communication service to millions of customers. As those customers own different makes and models of wireless terminals, it will be a big challenge to update an application program commonly utilized by all these wireless terminals. Examples of the problems are (1) how to inform these millions of customers that updating the application program is necessary, (2) how to let the customers update the application program, and (3) how to deliver the updated application program to all these wireless terminals without imposing an excessive traffic load on the wireless network. The details of these problems will be described below.

When a customer purchases a wireless terminal and starts using it, the customer generally considers that everything in the wireless terminal would work perfectly well for the whole life of the wireless terminal. Later, when it becomes necessary to update an application program on the wireless terminal, the customer is notified via postal mail, email or short messaging service (SMS) to update the affected application program. However, not all customers pay attention to such notifications. Some of the customers may feel annoyed by receiving such notifications. This is because the customer thinks that their wireless terminals and the application program must be working properly since they have not faced any problems with the application program and/or the wireless terminals. Accordingly, the customers do not consider that updating of the application program is necessary.

However, updating the application program may be critical and urgent, for example, because the application program contains software bugs, viruses or fraudulent codes which could cause serious security flaws or major privacy concerns. A defective application program may be incapable of doing intended jobs properly on the wireless terminal. Even in such an urgent case, some customers still may not update the application program since they utilize only phone features of the wireless terminal, not affected by the defective application program.

In addition, those who realize the need for updating the application program may still find it difficult and time consuming to update the application program by themselves. Not many customers, however, try to contact a customer support center to inquire how to update the application program and to get support by representatives of the customer support center.

Thus, many of wireless terminals in use continue to carry the old version of the application program or the defective application program.

Even if an appropriate notification of updating the application program is made to the customers and the customers decide to update the application program, delivering an updated application program to all wireless terminals brings up the next challenge.

For example, it is not practically possible to correctly count how many customers would initiate an updating process at a specific time. Knowing the number of customers (i.e., wireless terminals) who initiate the updating process is important because when several thousand customers try to download the updated application program concurrently, it could easily cause traffic problems in the network and/or may bring down even up-to-date servers providing the updated application program.

When such problems occur at the time that the customers try to update the application program, the customers would have to try multiple times to complete the download; and some of the customers may stop updating of the application program without properly completing the download. As a result, the overall customer experience would suffer negatively. In addition, increases in the number of customer of wireless terminals increase the potential for large number of customers to fail to update the program on their terminals. Accordingly, updating of an application program on millions of wireless terminals via the network is of the great concerns. Accordingly, there is a need to easily and properly update an application program on wireless terminals in a controlled manner to reduce or avoid problems like those the mentioned above.

SUMMARY

The teachings herein alleviate one or more of the above noted problems with a method and systems for updating an application program on wireless terminals in a controlled manner.

One example is a method for updating an application program on a wireless terminal. In the method, a server receives an inquiry from a wireless terminal for updating an application program. The server determines whether there is an updated program available for updating the application program based on information included in the inquiry from the wireless terminal. The server also determines whether updating the application program of the wireless terminal which sent the inquiry is permitted or not at the time of receiving the inquiry based on the information included in the inquiry and criteria information stored in the server. When the server determines that updating the application for the wireless terminal which sent the inquiry is available and is permitted, the server sends information necessary for updating the application program to the wireless terminal.

The information included in the inquiry may include at least one of information of a manufacturer of the wireless terminal, information of a model of the wireless terminal, information of firmware version of the wireless terminal, information of current version of the application program, an IP address of the wireless terminal, a mobile directory number assigned to the wireless terminal, and date and time of the inquiry.

The criteria information may include a database having plurality pieces of information about wireless terminals. In the database, the plurality pieces of information are divided into groups. The server may determine to which one of the groups the wireless terminal which sent the inquiry belongs based on the information included in the inquiry. When the determined one of the groups is permitted for updating the application program at the time of receiving the inquiry, the server determines that updating the application program for the wireless terminal that sent the inquiry is permitted.

The information necessary for updating the application program includes information indicating a place from which the updated program is downloaded. The information necessary for updating the application program may further include at least one of information indicating that updating the application program is available, a new version number of the updated program, information whether updating the application program is mandatory, and a maximum number of times that a user can skip the updating.

When the wireless terminal receives the information necessary for updating the application program, the wireless terminal prompts the user of the wireless terminal to update the application program. When the wireless terminal receives an input indicating that the user accepts the updating of the application program, the wireless terminal initiates communications through the network for updating of the application program.

The wireless terminal accesses the place to download the updated program for updating the application program based on the information indicating the place to download the updated program. The place from which the updated program is downloaded may be identified by a URL of a download server. The download server may comprise a database storing at least one of information of a manufacture of the wireless terminal, information of a model of the wireless terminal, information of firmware version of the wireless terminal, information of current version of the application program, an IP address of the wireless terminal, a mobile directory number assigned to the wireless terminal, and time and date of last updating the application program by the wireless terminal. When updating of the application program is completed, the download server may update a record in the database for the wireless terminal.

When the wireless terminal prompts the user of the wireless terminal to update the application program and when the wireless terminal receives an input indicating that the user declines the updating of the application program, the wireless terminal may prompt the user to input a number of times the user wants to skip the update. In such a case, the wireless terminal does not update the application program until the user inputs a request for updating the application program. In this example, the information necessary for updating the application program may include a maximum number of times that a user can skip the updating. The number of times the user wants to skip the update may be allowed to be set not more than the maximum number of times.

Another example is a server for updating an application program on a wireless terminal. The server may include one or more processors, a storage device accessible by the one or more processors, storing a server program and a database and a communication unit, controlled by the one or more processors, for communication through a network with a wireless terminal.

The server program includes instructions which, when executed by the one or more processors, configure the server for performing several functions. For example, the server receives an inquiry from the wireless terminal for updating an application program on the wireless terminal. Then, the server determines whether or not there is an updated program available for updating the application program based on information included in the inquiry, and also determines whether or not updating the application program of the wireless terminal which sent the inquiry is permitted or not at the time of receiving the inquiry based on the information included in the inquiry and criteria information stored in the database. When the server determines that updating the application for the wireless terminal which sent the inquiry is available and permitted, the server sends information necessary for updating the application program to the wireless terminal.

The information included in the inquiry may include at least one of information of a manufacturer of the wireless terminal, information of a model of the wireless terminal, information of firmware version of the wireless terminal, information of current version of the application program, an IP address of the wireless terminal, a mobile directory number assigned to the wireless terminal, and date and time of the inquiry.

The criteria information includes a plurality of pieces of information about wireless terminals, and the plurality pieces of information are divided into groups. The plurality pieces of information may be divided into groups based on at least one of a manufacturer of the wireless terminal, information of a model of the wireless terminal, information of firmware version of the wireless terminal, information of current version of the application program, an IP address of the wireless terminal and a mobile directory number assigned to the wireless terminal. Each of the groups is assigned with criteria whether updating of the application program is permitted or not. The server program may cause the server to determine to which one of the groups the wireless terminal which sent the inquiry belongs based on the information included in the inquiry, and to determine that updating the application for the wireless terminal which sent the inquiry is permitted, when the criteria indicates that the determined one of the groups is permitted for updating the application program.

The criteria may be a time window in which updating of the application program is permitted. The server may determine that updating the application for the wireless terminal which sent the inquiry is permitted, when the time of receiving the inquiry falls on the time window.

The information necessary for updating the application program includes information indicating a place from which the updated program is downloaded. The information necessary for updating the application program may further include at least one of information indicating that updating the application program is available, a new version number of the updated program, information whether updating the application program is mandatory, and a maximum number of times that a user can skip the updating.

Yet another example is a wireless terminal. The wireless terminal may include a processor, a user interface coupled to the processor, a wireless communication unit controlled by the processor and a storage device accessible by the processor which stores a terminal program. The terminal program includes instructions which, when executed by the processor, configure the wireless terminal for performing several functions. For example, when the wireless terminal executes an application program on the wireless terminal, the wireless terminal sends an inquiry to a server asking whether updating the application program is available or not. In response, the wireless terminal receives information necessary for updating the application program from the server. The wireless terminal prompts a user of the wireless terminal via the user interface to update the application program. When the wireless terminal receives an input via the user interface indicating that the user declines the updating the application program, the wireless terminal prompts the user to input a number of times the user wants to skip the update. In such a case, the wireless terminal does not update the application program until the user inputs a request for updating the application program.

The information necessary for updating the application program includes a maximum number of times that a user can skip the updating. The number of times the user wants to skip the update is allowed to be set not more than the maximum number of times.

The inquiry includes at least one of information of a manufacture of the wireless terminal, information of a model of the wireless terminal, information of firmware version of the wireless terminal, information of current version of the application program, an IP address of the wireless terminal, a mobile directory number assigned to the wireless terminal, and date and time of the inquiry.

The instructions of the terminal program may further configure the wireless terminal for performing a function of forcibly updating the application program, when the user skips the updating the number of times the user sets.

The instructions may further configure the wireless terminal for performing a function of, when the wireless terminal receives an input indicating that the user accepts the updating the application program, updating the application program.

The information necessary for updating the application program includes information indicating a place from which the updated program is downloaded. The wireless terminal may access the place to download the updated program for updating the application program. The place from which the updated program is downloaded may be identified by a URL of a download server.

The instructions may further configure the wireless terminal for performing a function of, upon completing updating the application program, sending notification of completion to the download server.

Another example of the present disclosure is directed to a non-transitory computer readable recording medium storing a terminal program. The terminal program includes instructions which, when executed by a processor, cause a wireless terminal to perform several functions. For example, when the wireless terminal executes an application program on the wireless terminal, the wireless terminal sends an inquiry asking whether updating the application program is available or not through a wireless communication network to a server. In response, the wireless terminal receives information necessary for updating the application program from the server. Then, the wireless terminal prompts a user of the wireless terminal via the user interface to update the application program. When the wireless terminal receives an input via the user interface indicating that the user declines the updating the application program, the wireless terminal prompts the user to input a number of times the user wants to skip the update. In such a case, the wireless terminal does not update the application program until the user inputs a request for updating the application program.

A non-transitory computer readable recording medium includes, but is not limited to, optical disks such as a CD, DVD or Blu-Ray® disks, ROM, RAM, HDD, Flash memories or memory cards.

Another aspect of the present disclosure may include a method of transferring electronic data. The method include steps of reading out the program stored in the non-transitory computer readable recording medium as mentioned above, and transferring the program over a network.

Further, an example of this disclosure may include a system for updating an application program on a plurality of wireless terminals. The system may include a router connectable to the plurality of wireless terminal via a wireless communication network, and a plurality of servers, each of which is the server as set forth above and is connected for communication through the router. The router is configured to receive inquiries for updating the application program from the plurality of wireless terminals, sort the inquiries and forward the inquiries to respective servers based on results of sorting.

The router may sort the inquiries based on a manufacture of the wireless terminals, information of a model of the wireless terminals, information of firmware version of the wireless terminals, information of current version of the application program, an IP address of the wireless terminals, a mobile directory number assigned to the wireless terminals, and date and time of the inquiries. The router may also sort the inquiries based on a mobile directory number assigned to the wireless terminals sending the inquiries.

The present method and apparatus, together with further objects and advantages, can be better understood by reference to the following detailed description and the accompanying drawings.

BRIEF DESCRIPTION OF THE DRAWINGS

FIGS. 5A-5C are examples of a table structure of a database that may be used in an application program updating process.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various systems and methods disclosed herein relate to updating an application program on a wireless terminal in a controlled matter, and a system, server, and wireless terminal associated with the method. Reference now is made in detail to the examples illustrated in the accompanying drawings and discussed below.

Figure 1A:
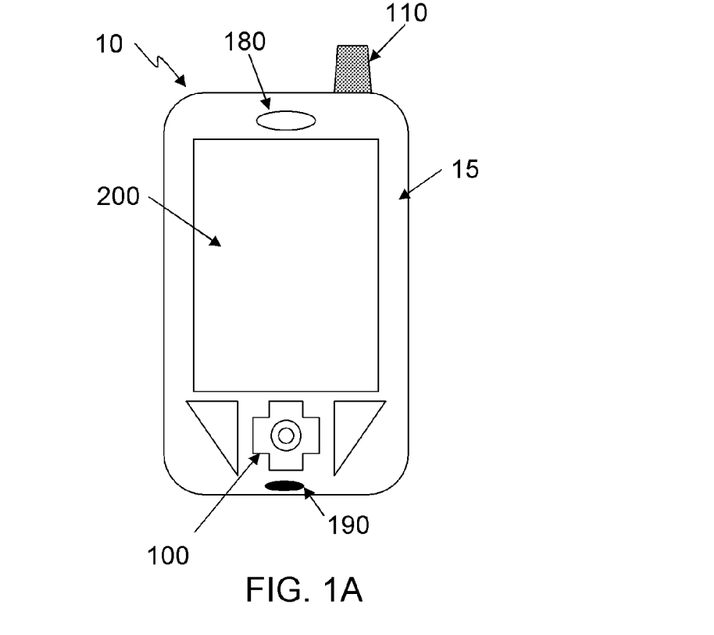
FIG. 1A is a front view of an exemplary wireless terminal.

FIG. 1A illustrates a front view of an exemplary wireless terminal. The wireless terminal 10, for example, is a touch sensitive "smart" cellular phone. Of course, the techniques described here are applicable to other types of wireless terminals. The touch sensitive wireless terminal 10 includes a main body 15, input keys 100, antenna 110, a speaker 180, a microphone 190 and a touch panel display 200. The configuration of the wireless terminal elements is not limited to the arrangement shown in FIG. 1A.

Figure 1B:
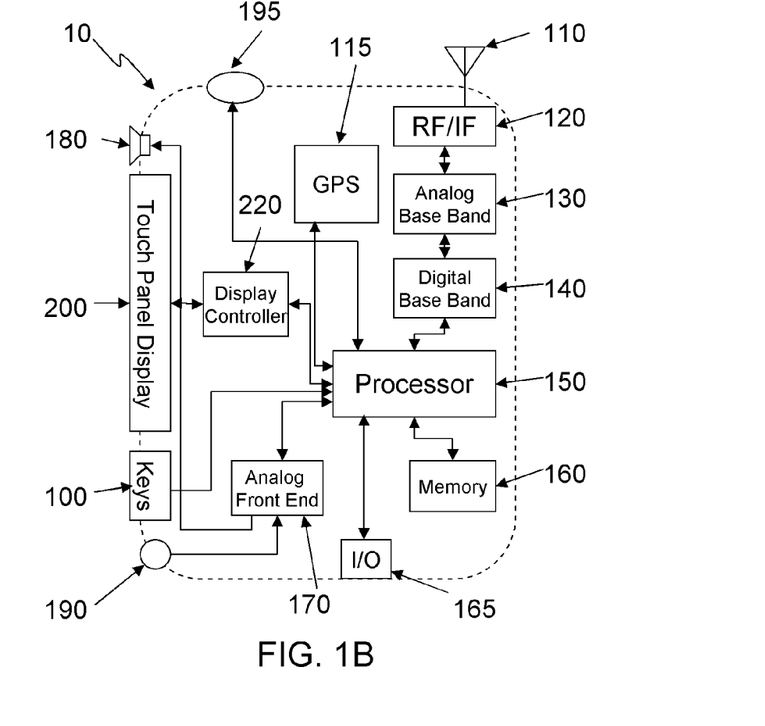
FIG. 1B is an exemplary block diagram of components of a wireless terminal.

FIG. 1B shows an exemplary block diagram of elements of the wireless terminal 10 of FIG. 1A. The wireless terminal 10 includes an RF interface 120 connected to the antenna 110, an analog base band processor 130 and a digital base band processor 140 connected to a processor 150. The processor 150 may be a single processor or include multiple processors. A display controller or driver 120 is connected to the touch panel display 200 and the processor 150 for controlling the touch panel display 200. An analog front end processor 170 is connected to the processor 150 for controlling the speaker 180 and the microphone 190. The processor 150 in configured to control the display controller 220, RF circuits (120, 130 and 140), the analog front end processor, and an I/O circuit 165. The processor 150 also connects to memory 160 as a storage medium. The memory 160 may include, for example, a RAM, a ROM or a flash memory. The memory 160 may store any number of application programs.

The memory 160 also stores a terminal program which realizes a method for updating an application program on the wireless terminal as disclosed herein. It is noted that the terminal program can be one of application programs, but in this disclosure, the terminal program is a program which executes the method of updating an application program disclosed herein. It is also noted that the terminal program may incorporated in the application program as a part thereof. The terminal program may be implemented by a ROM embedded in a semiconductor device together with a processor. In the alternative, the processor 150 may be configured to cause the wireless terminal to perform the method. Of course, a part of or an entire of the wireless terminal may be so structured or configured by hardware to perform the method. The wireless terminal 10 may further include a GPS receiver 115.

Figure 2:
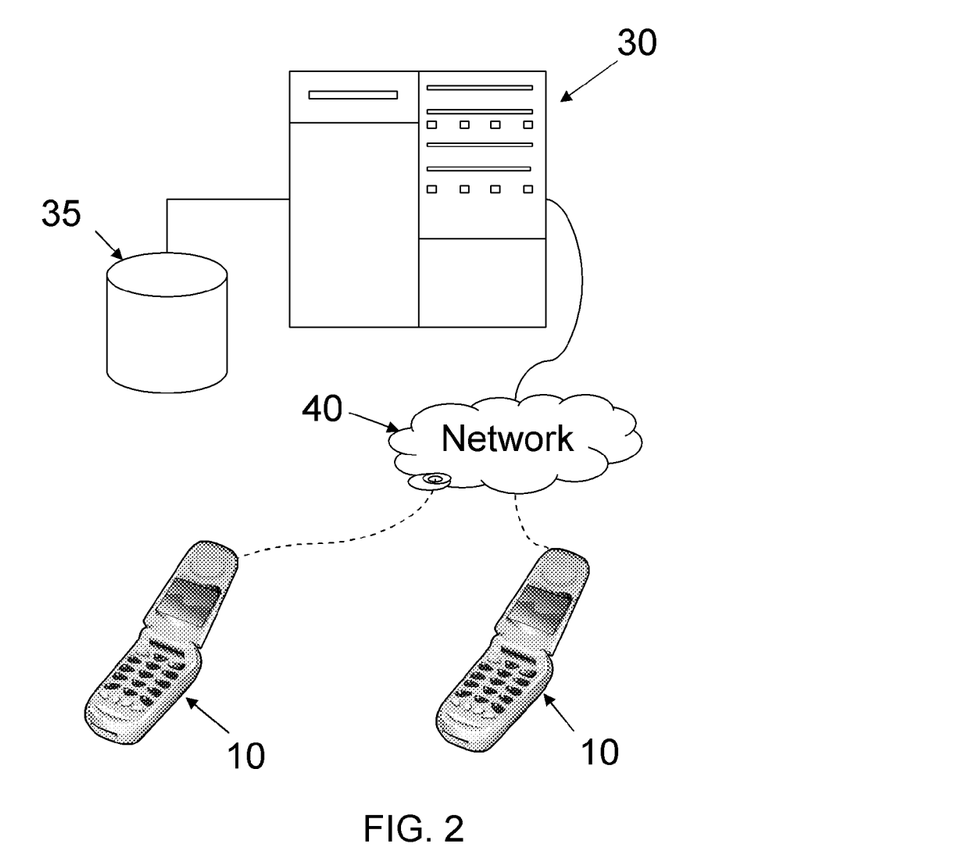
FIG. 2 is an exemplary system diagram of server interaction with wireless terminals.

FIG. 2 is an exemplary system diagram of server interaction with wireless terminals. A number of the wireless terminals 10 are accessible to the update server 30 through a network 40 including a wireless network. The server may include a storage device 35 for storing information and/or data for updating one or more application programs.

Figure 3:
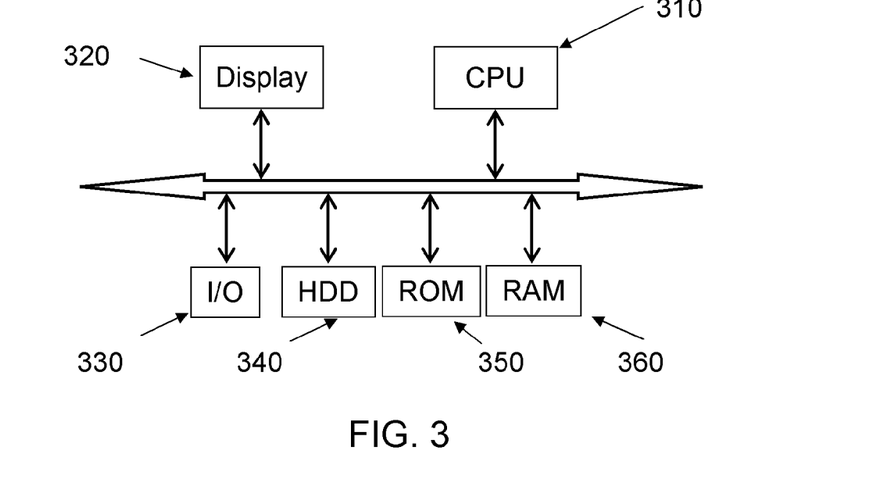
FIG. 3 is an exemplary functional block diagram of an exemplary server.

FIG. 3 is a functional block diagram of an exemplary server 30. As shown in FIG. 3, the server 30 may be a computer system including a CPU 310 and a storage device 340, for example a hard disk drive (HDD). The CPU 310 may be a single processor or multiple processors. The HDD 340 may store application programs which run on the server. As shown in FIG. 3, the server 340 may also include a ROM 350, a RAM 360, an I/O port 330 or a display 320. The server 30 is connected to network 40. One of HDD 340, ROM 350 and RAM 360 includes a server program which, when executed by the CPU 310, causes the server 30 to perform the server-implemented functions disclosed herein. Of course, a part of or the entire of the server may be structured or configured by hardware so as to perform the functions. Also, those skilled in the art will appreciated that the functions attributed to the one server may be implemented across a number of physically separate hardware platforms connected to the network in a distributed implementation.

Figure 6:
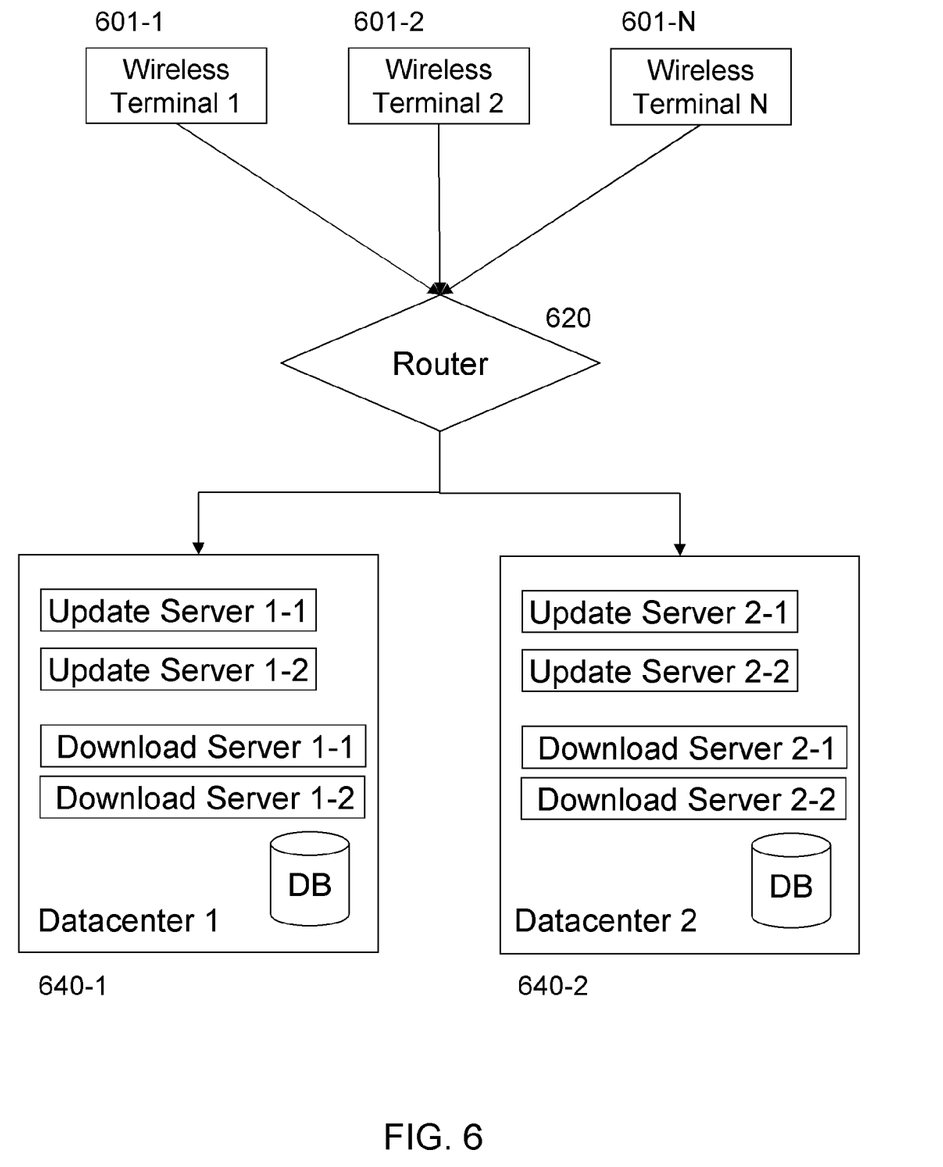
FIG. 6 is an example of a system for updating an application program on wireless terminals.

As shown in FIG. 6, an overall program update system may include multiple datacenters 640-1, 640-2, each of which includes one or more update servers and one or more download servers. Each of the various servers may be implemented by a computer like that shown in FIG. 3. Multiple wireless terminals 601-1, 601-2, 601-N may access at least one of the datacenters through a router 620.

One of the features of the present technique is the updating of an application program resident on many wireless terminals in a controlled manner. In order to achieve, the method disclosed herein permits updating an application program only for a specific group or segment of the wireless terminals at the same time.

Figure 4:
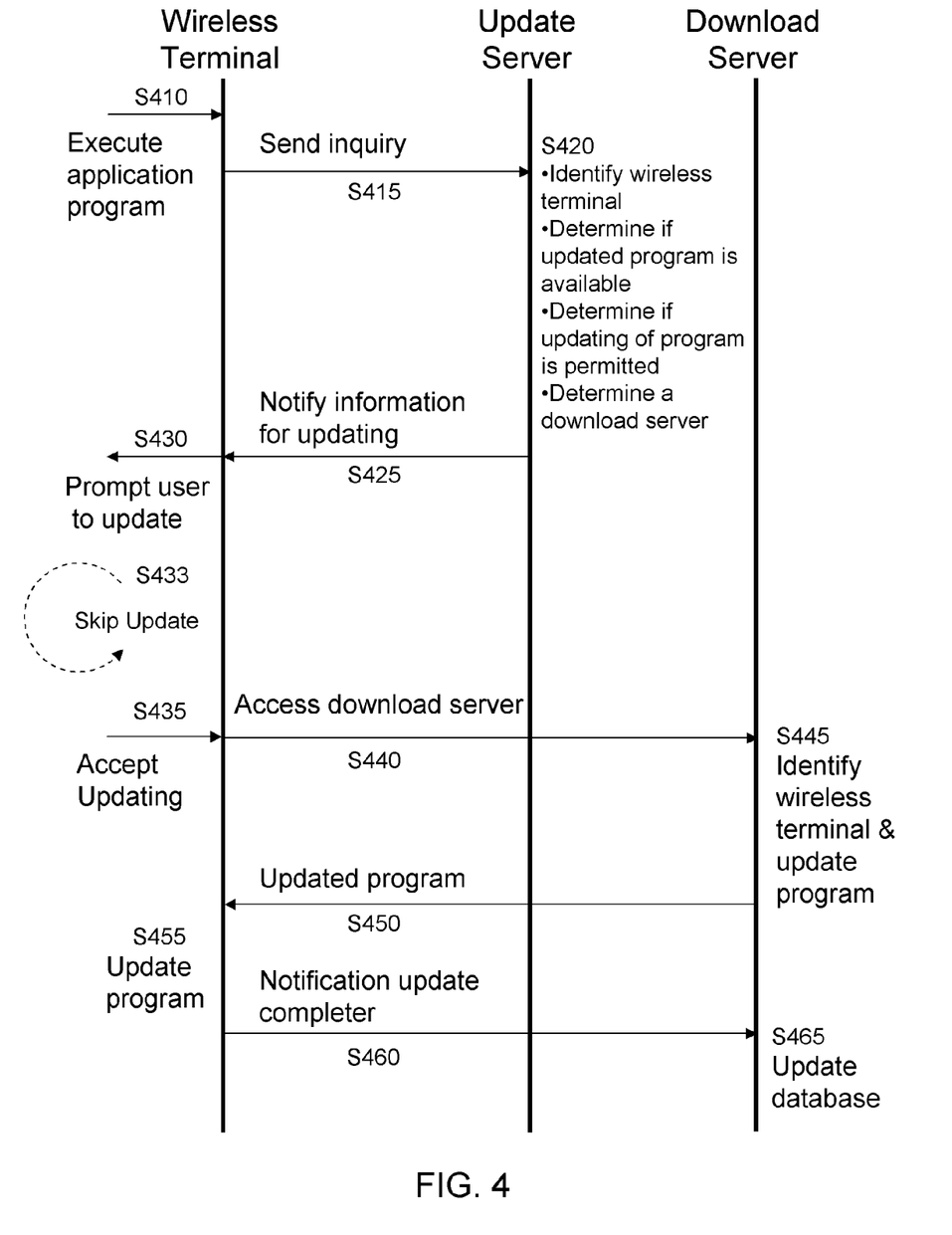
FIG. 4 is an example of a procedure for updating an application program on a wireless terminal.

Execution of the application program itself initiates an update related inquiry, which may lead to an update of the program if scheduled for an update by the service provider. Referring now to FIG. 4, upon executing an application program on the wireless terminal 10 (S410), the wireless terminal sends an inquiry to the update server 30 whether updating the particular application program is necessary and the updating is permitted (S415). The inquiry may include information such as, but not limited to, make and model of the wireless terminal, firmware version, current version of the particular application program, an IP address, Mobile Directory Number (MDN) assigned to the wireless terminal, date and time of the inquiry.

When the update server 30 receives the inquiry from the wireless terminal 10, the server searches its database to find a matching record for the wireless terminal 10 sending the inquiry (S420) based on the information included in the inquiry. For example, the server 30 searches a record associated with the same model as the particular wireless terminal 10. When the server finds a matching record for the wireless terminal, the server 30 determines whether an updated program for the application program is available or not (S420). If an updated program is available, the server 30 determines whether updating of the application program is permitted for the wireless terminal at the time of inquiry (S420). For example, to control network traffic levels, different groups of different wireless terminal may be scheduled to receive the update of the particular application program during different time periods. It is noted that determining whether updating is permitted or not may be performed before determining whether the updated program is available or not.

In step S420, the update server further determines which download server the wireless terminal can access in order to download the updated program. The update sever determines the download server based on various criteria including, but not limited to, the information included in the inquiry. By selecting an appropriate download server, it is possible to control the traffic levels of the network.

FIG. 5A is an exemplary table structure of the database managed by the server 30. In the database, particular wireless terminals are divided into several groups or segments based on some criteria. The criteria may be one or more of the columns of the table 500. For example, the wireless terminals are divided into multiple segments based on any combination of the following criteria: (1) Make and model of a wireless terminal (using the field DEVICE_MAKE_MODEL); (2) Version number of the wireless terminal's current firmware (FIRMWARE_VERSION); (3) Current version number of the application program (IMPACTED_APP_VERSION); (4) Area code of the mobile directory number (ONLY_FOR_NPA); (5) Exchange code of the mobile directory number (ONLY_FOR_NXX); (6) Wireless terminals that connect to a particular datacenter (ONLY_FOR_DATACENTER); and (7) Wireless terminals that connect to a particular set of servers (ONLY_FOR_SERVERS).

Each segment is allocated a unique time window specified by the two fields DATE_AVAILABLE_FROM and DATE_AVAILABLE_TO. It is noted that "date" includes time. If the wireless terminal 10 sending the inquiry belongs to a specific segment, the server 30 looks at this time window in the applicable segment record in the database. If the time of inquiring falls within the time window, the server 30 determines that updating the application program for the wireless terminal 10 is permitted.

Figure 5B:
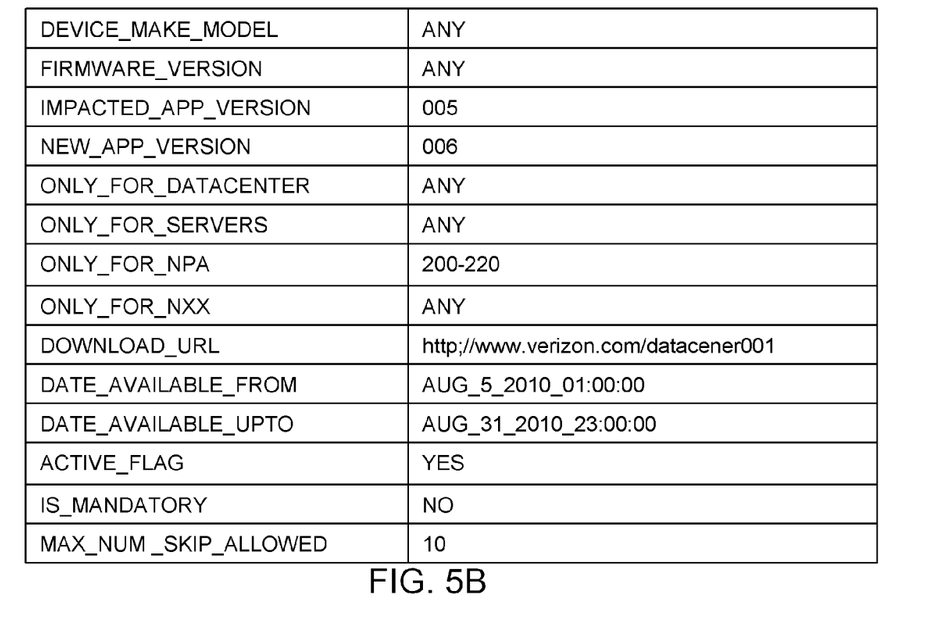

For example, assume that the time window from 1:00 a.m. of Aug. 1, 2010 to 11:00 p.m. of Aug. 31, 2010 is assigned only for mobile terminals having an area code (NPA) of the respective MDNs in a range of 200 to 220 (see, FIG. 5B). If a wireless terminal having area code 212 sends an inquiry of updating the application program on August 5, the server 30 determines that updating the application program is permitted. If in fact the updated application program is available, the server 30 sends information necessary to update the application program to the wireless terminal having the area code 212.

If a wireless terminal having an area code 703 sends an inquiry on August 5, however, the server 30 determines that the updating is not permitted and does not send the information necessary to update the application program to the wireless terminal. Further, if the wireless terminal having an area code 212 sends the inquiry of September 1, the server 30 determines that the updating is not permitted and does not send the information necessary to update the application program to the wireless terminal.

FIG. 5B may be an example for the case that a data volume of the updating program is small enough for the download server and the network so that many wireless terminals can access the download server concurrently. In contrast, when the data volume of the update program is so large that it is necessary to limit the number of wireless terminals downloading the update program concurrently to a small level, a segmentation like that in FIG. 5B may be utilized.

Figure 5C:
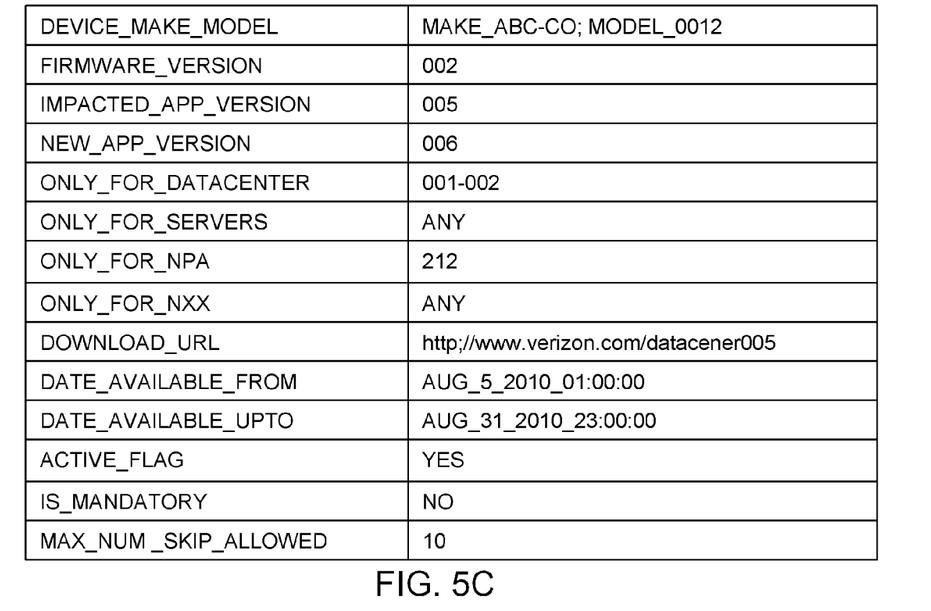

In the example FIG. 5C, the NPA parameter is limited to one area code 212, limiting the wireless terminals permitted to update the application program to those with MDN values having the 212 area code. As set forth above, by changing parameters in each criteria, it is possible to control a number of wireless terminal accessing the download server concurrently to update the application program.

As set forth above, any one of criteria (1)-(7), taken alone or in any combination thereof, can be utilized to segment the wireless terminals. The time window may be flexibly determined. For example, the time window may be specific time slot of a day (e.g., 1:00 p.m. to 5:00 p.m. of weekday), or may be intermittently repeated (e.g., August 1 to August 31, October 1 to October 30 and December 1 to December 31).

Each segment is also assigned with a number indicating how many times a user can skip prompts to update the application program (MAX_NUM_SKIP_ALLOWED). When the prompt for an update is for the first time, the user is given a choice to select a number for how many times the user would be prompted before forcing the update. The field named MAX_NUM_SKIP_ALLOWED indicates the maximum number allowed for the wireless terminal of the segment. The wireless terminal will keep track of the number of times the user is prompted by utilizing a storage medium on the wireless terminal. Alternatively it can be tracked by the server side.

If updating the application program is mandatory, the IS_MANDATORY field may be used. If it is necessary to activate or deactivate a particular time window for some reason (e.g., critical server failure, discovery of a new issue, updating becoming a must for some security reason etc.), a field named ACTIVE_FLAG acts as a control switch. If the value of ACTIVE_FLAG shows "Yes," the time window for update is active. If the value is "No," the time window becomes ineffective.

When the server 30 determines that updating the application program is available and is permitted as set forth above (S420 in FIG. 4), the server sends information necessary to update the application program to the wireless terminal. The information necessary for updating the application program includes information indicating a place from which the updated program is downloaded (S420).

The information necessary for updating the application program may further include at least one of information indicating that updating the application program is available, a new version number of the updated program, information whether updating the application program is mandatory, and a maximum number of times that a user can skip the updating, and.

If no matching record was found, no updated program is available or updating is not permitted for the wireless terminal sending the inquiry, the server 30 may send the wireless terminal a flag indicating that the application program on the wireless terminal is not updated.

The place from which the updated program is downloaded may be identified by a URL of a download server (DOWNLOAD_URL). By using DOWNLOAD_URL, it is possible to distribute the traffic load and the download server load to multiple points or servers. It is noted that for different segments, different server URLs may be assigned as well. If DOWNLOAD_URL is not used, the wireless terminal will access a predetermined download server (which may be the same as the update server).

When the mobile terminal receives the information necessary for updating the application program, the wireless terminal prompts the user of the wireless terminal to update the application program through a user interface (e.g., display 200) (S430). When the wireless terminal receives an input indicating that the user accepts the updating of the application program through the user interface (S435), the wireless terminal processes updating the application program.

To update the application program, the wireless terminal accesses a download server (S440). The download server may be indicated by DOWNLOAD_URL or the application program may already include information about communicating with the download server. The download server may be the same as the update server 30 or may have a different hardware platform and/or server program as the update server 30. The download server may reside in the same data center as the update server 30 as shown in FIG. 6, or may reside outside the data center.

When the download server receives a download request from the wireless terminal 10, the download server may search its database to identify the wireless terminal and the corresponding updated application (S445). This step may not be necessary. Then, the download server sends the updated program to the wireless terminal 10 through the network 40 (S450). The wireless terminal 10 receives the updated program, and installs the update program into the wireless terminal to update the application program (S455). When the updating is completed, the wireless terminal may send a notification of completion to the download server (S460). The notification may be sent to the update server 30, too.

When the download server and/or update server receive the notification, the download server and/or update server update the database with respect to the wireless terminal that completed the program update (S465). The server may update parameters such as MDN, IP address, date and time of the request, old version of the application program, the new version of the application program, update server name, datacenter name, etc. It is noted that updating the database may be performed before sending the updated program (S445).

When the wireless terminal prompts the user of the wireless terminal to update the application program, the user may not want to update the application program right away. In such a case, the user may input via the user interface an indication that the user declines the updating the application program, for example, by tapping a "decline" button displayed on the display device 200. Upon receiving the input indicating "decline," the wireless terminal prompts the user to input a number of times the user wants to skip the update via the user interface. Then, the user inputs the desired number, and the wireless terminal stores the number. The number may be stored in the wireless terminal and/or in the update server or the download server.

When the user inputs the number of times for skipping the program updating, the wireless terminal does not update the application program until the user inputs a request for updating the application program. For example, assume that the user sets the number 5 (five) for skipping the updating. Every time when the application program is executed, the wireless terminal accesses the update server (S410, S415), and receives information necessary for updating the application program (S425). However, since the user set the number of times to skip the update, the wireless terminal does not prompt the user to update the program each time. When the number of times that the user has skipped the update reaches 5 (five), i.e., the stored number of times, the wireless terminal prompts the user to update the program and/or forcibly updates the application program. At this time, if the number of time that the user set is less than the maximum number of times indicated by the MAX_NUM_SKIP_ALLOWED filed, the wireless terminal may prompt the user to set the number of times to skip the update and the user may decline the update and further input a new number of times to skip the updating.

The number of times for skipping the update that the user can input (or total number of skipping time that the user has input) should be not more than the maximum number which is contained in the information necessary for updating the application program (e.g., MAX_NUM_SKIP_ALLOWED).

In the alternative, when the number of times for skipping the update has been input and stored, every time when the application program is executed, the wireless terminal may simply continue executing the application program without re-accessing the update server (S433). When the skipped times reach the stored number, the wireless terminal may prompt the user to update the program and/or forcibly update the application program. If the user accepts updating the program in response to the prompt, the wireless terminal accesses the download program according to the information necessary to update the application program, which has been received from the update server. When the update skipped times reach the stored number, the wireless terminal may re-access the update server and receive up-to-date information necessary to update the application program.

If the IS_MANDATORY field indicates that updating the application program is mandatory, the wireless terminal updates the application program regardless of declining of the updating by the user or inputting the number of times for skipping the update. In such a case, the wireless terminal may indicate that the updating is mandatory thorough the user interface 200.

FIG. 6 illustrates an example of a system for updating an application program on wireless terminals. In this figure, multiple datacenters 640-1, 640-2 are setup to implement the above disclosed method for updating the application program on the wireless terminals. The system may include a router 620 and the datacenters 640-1, 640-2. Each datacenter may include one or more update servers and one or more download servers.

The router 620 is configured to sort the inquiries from multiple wireless terminals 601-1, 601-2, 601-3, based on some pre-defined algorithm. For example, the router 620 may sort the inquiries based on the area codes of MDN of the inquiring wireless terminal included in the inquiries. Based on such pre-defined algorithm, the router 620 may send the inquiries from a particular wireless terminal always to a specified datacenter. In the datacenter, the inquiry may be directed to any update server at the start of an updating process, and once the inquiry is directed to a specific update server, the updating process is performed by the specific update server.

As shown in FIG. 6, the datacenter may include one of more download server. The update server usually designates one of the download servers residing in the same datacenter as the update server by sending the DOWNLOAD_URL of the particular download server to the wireless terminal in the response to the update inquiry. However, the update server may designate any download server residing in any of the datacenters, if necessary.

As shown by the above discussion, at least some implementations for updating the application program on the wireless terminal may involve a program, for example, for the processor of the wireless terminal and/or for the update server. Program aspects of the technology may be thought of as "products" or "articles of manufacture" typically in the form of executable code and/or associated data that is carried on or embodied in a type of non-transitory computer readable medium. "Storage" type media include any or all of the memory of the supporting electronics of the terminal or server that executes the respective program, such as various semiconductor memories, tape drives, disk drives and the like, which may provide storage at any time for the software programming. All or portions of the software may at times be communicated through the Internet, the wireless network serving the terminals or various other telecommunication networks. Such communications, for example, may enable loading of the software from one computer or processor into another computer or processor, for example, from a host or management server into the download server or into the wireless terminal. For example, the program stored in the computer readable recording medium may be read out from the computer readable recording medium and transferred over a network, e.g., the Internet.

In the example, execution of the program trigger an inquiry to the update server to determine if an update is available. If no update program is available, the user need not even to be aware of the inquiry. If the update program is available, the permission determination process with respect to each particular wireless terminal provides a flexible mechanism to control or throttle actual download traffic between the wireless terminals and the download server.

One of the advantages of the present exemplary update technique is that at any given time, a limited number of wireless terminals can access the download server(s) and get the application program updated. Thus, however large the number of wireless terminals may be, the updating of the application program will be performed in a controlled manner, which makes the updating process manageable. As different groups (or segments) of wireless terminals will update the application program at different times, the download servers or the networks will not be overwhelmed with uncontrollable number of download requests. This improves stability and consistency of the updating system as a whole.

Another advantage of the present exemplary update technique is that the customers will have the flexibility to update the application program any time within a specified time window, which will result in a better user experience.

The above disclosed method and/or system may also establish a better control over the number of versions of a particular application program which is active in the field by utilizing the fields of the tables in the database. This will ensure better customer support and higher level of user satisfaction.

Further, by utilizing the IS_MANDATORY field, the method and/or system that inquire for an update of the program at each execution of the application program will not allow some version of the application program to run without updating. The method and/or system disclosed herein will ensure confirmed delivery of a critical update program (e.g., patches) to all wireless terminals running the application program in a timely manner.

Another advantage is that an owner, a provider or a developer of the application program can know information about their application program. For example, the system processing the inquiry and update may provide various reports of patterns and trends in customer behavior, such as: on which days and at what times of the day the users prefer most to update the application program, how many versions are there in the field, etc. These pieces of information may be very helpful in developing better system design and more effective capacity-planning.

The exemplary update procedure may also make it possible to update only selected versions of the application program. This will be helpful when only some version(s) of the application program have issues that need to be fixed or changed. The disclosed method and/or system are also helpful when only some particular batches or models of the wireless terminals need to install patches or bug-fix programs.

Although certain specific examples have been disclosed, it is noted that the present teachings may be embodied in other forms without departing from the spirit or essential characteristics thereof. The present examples described above are considered in all respects as illustrative and not restrictive. The patent scope is indicated by the appended claims, and all changes that come within the meaning and range of equivalency of the claims are therefore intended to be embraced therein.

We claim:

1. A method for updating an application program on a wireless terminal, the method comprising:
    receiving, by a server, an inquiry from a wireless terminal for updating an application program;
    responsive to receiving the inquiry by the server, determining, by the server, whether there is an updated program available for updating the application program, based on information included in the inquiry;
    upon determining that the updated program is available, determining, by the server, whether updating the application program of the wireless terminal which sent the inquiry is permitted or not at the time of receiving the inquiry, based on the information included in the inquiry and criteria information stored in the server; and
    upon determining that updating the application for the wireless terminal which sent the inquiry is available and is permitted, sending information necessary for updating the application program from the server to the wireless terminal, wherein:
    the information necessary for updating the application program includes information indicating a place from which the updated program is downloaded,
    when the wireless terminal receives the information necessary for updating the application program, the user of the wireless terminal is prompted to update the application program, when the wireless terminal receives an input via a user interface indicating that the user declines the updating the application program, prompting the user to input a number of times the user wants to skip the update,
    the wireless terminal does not update the application program until the user inputs a request for updating the application program, and
    when the wireless terminal receives an input indicating that the user accepts the updating of the application program, the application program is updated by accessing the place and downloading the updated program for updating the application program.

2. The method of claim 1, wherein the information included in the inquiry includes at least one of information of a manufacturer of the wireless terminal, information of a model of the wireless terminal, information of a firmware version of the wireless terminal, information of a current version of the application program, an IP address of the wireless terminal, a mobile directory number assigned to the wireless terminal, and a date and time of the inquiry.

3. The method of claim 2, wherein:
    the criteria information includes a database having a plurality of pieces of information about wireless terminals, in which the plurality of pieces of information are divided into groups,
    the server determines to which one of the groups the wireless terminal which sent the inquiry belongs based on the information included in the inquiry, and
    the server determines that updating the application program for the wireless terminal which sent the inquiry with the updated program is permitted, when the determined one of the groups is permitted for updating the application program at the time of receiving the inquiry.

4. The method of claim 1, wherein the information necessary for updating the application program further includes at least one of information indicating that updating the application program is available, a new version number of the updated program, information whether updating the application program is mandatory, and a maximum number of times that a user can skip the updating.

5. The method of claim 1, wherein the place from which the updated program is downloaded is identified by a URL of a download server.

6. The method of claim 5, wherein:
    the download server comprises a database storing at least one of information of a manufacturer of the wireless terminal, information of a model of the wireless terminal, information of a firmware version of the wireless terminal, information of a current version of the application program, an IP address of the wireless terminal, a mobile directory number assigned to the wireless terminal, and a time and date of last updating the application program by the wireless terminal, and
    upon completing updating the application program, the download server updates a record in the database for the wireless terminal.

7. The method of claim 1, wherein:
    when the wireless terminal receives an input indicating that the user declines the updating of the application program, the wireless terminal prompts the user to input a number of times the user wants to skip the update, and the wireless terminal does not update the application program until the user inputs a request for updating the application program.

8. The method of claim 7, wherein:
the information necessary for updating the application program further includes a maximum number of times that a user can skip the updating, and
the number of times the user wants to skip the update is allowed to be set not more than the maximum number of times.

9. A server, comprising a server program for implementing the method of claim 1, the server further comprising:
one or more processors;
a storage device accessible by the one or more processors, storing the server program and a database; and
a communication unit, controlled by the one or more processors, for communication through a network with a wireless terminal.

10. A system for updating an application program on a plurality of wireless terminals, the system comprising:
a router connectable to the plurality of wireless terminal via a wireless communication network; and
a plurality of servers, each of which is the server of claim 9 and is connected for communication through the router, wherein:
the router is configured to:
receive inquiries for updating the application program from the plurality of wireless terminals;
sort the inquiries; and
forward the inquiries to respective servers based on results of sorting.

11. The system of claim 10, wherein the router is configured to sort the inquiries based on a manufacturer of the wireless terminals, information of a model of the wireless terminals, information of a firmware version of the wireless terminals, information of a current version of the application program, an IP address of the wireless terminals, a mobile directory number assigned to the wireless terminals, and a date and time of the inquiries.

12. The system of claim 10, wherein the router is configured to sort the inquiries based on a mobile directory number assigned to the wireless terminals sending the inquiries.

13. A wireless terminal comprising:
a processor;
a user interface coupled to the processor;
a wireless communication unit controlled by the processor; and
a storage device accessible by the processor, storing a terminal program, wherein:
the terminal program includes instructions which, when executed by the processor, configure the wireless terminal for performing functions of:
upon executing an application program on the wireless terminal, sending an inquiry whether updating the application program is available or not through a wireless communication network to a server;
receiving information necessary for updating the application program from the server in response to the inquiry;
responsive to receiving the information, prompting a user of the wireless terminal via the user interface to update the application program,
when the wireless terminal receives an input via the user interface indicating that the user declines the updating the application program, prompting the user to input a number of times the user wants to skip the update, and
the wireless terminal does not update the application program until the user inputs a request for updating the application program, wherein:
the information necessary for updating the application program includes information indicating a place from which the updated program is downloaded, and
when the wireless terminal receives an input indicating that the user accepts the updating of the application program, the instructions cause the wireless terminal to update the application program by accessing the place and downloading the updated program for updating the application program.

14. The wireless terminal of claim 13, wherein:
the information necessary for updating the application program includes a maximum number of times that a user can skip the updating, and
the number of times the user wants to skip the update is allowed to be set not more than the maximum number of times.

15. The wireless terminal of claim 14, wherein the instructions further configure the wireless terminal for performing a function of, when the user skips the updating the number of times set by the user, forcibly updating the application program.

16. The wireless terminal of claim 15, wherein the inquiry includes at least one of information of a manufacturer of the wireless terminal, information of a model of the wireless terminal, information of a firmware version of the wireless terminal, information of a current version of the application program, an IP address of the wireless terminal, a mobile directory number assigned to the wireless terminal, and a date and time of the inquiry.

17. The wireless terminal of claim 13, wherein the place from which the updated program is downloaded is identified by a URL of a download server.

18. The wireless terminal of claim 17, wherein the instructions further configure the wireless terminal for performing a function of, upon completing updating the application program, sending notification of completion to the download server.

19. A non-transitory computer readable recording medium storing a terminal program wherein:
the terminal program includes instructions which, when executed by a processor, cause a wireless terminal to perform functions of:
upon executing an application program on the wireless terminal, sending an inquiry whether updating the application program is available or not through a wireless communication network to a server;
receiving information necessary for updating the application program from the server in response to the inquiry;
responsive to receiving the information, prompting a user of the wireless terminal via a user interface to update the application program; and
when the wireless terminal receives an input via the user interface indicating that the user declines the updating the application program, prompting the user to input a number of times the user wants to skip the update,
wherein:
the wireless terminal does not update the application program until the user inputs a request for updating the application program,
the information necessary for updating the application program includes information indicating a place from which the updated program is downloaded, and
when the wireless terminal receives an input indicating that the user accepts the updating of the application program, the instructions cause the wireless terminal to update the application program by accessing the place and downloading the updated program for updating the application program.

20. A method of transferring electronic data, the method comprising steps of:
reading out the program stored in the non-transitory computer readable recording medium according to claim 19; and
transferring the program over a network.

* * * * *